United States Patent
Zhang

(10) Patent No.: US 11,913,780 B2
(45) Date of Patent: Feb. 27, 2024

(54) MEASURING TAPE WITH ROLLOVER RESISTANCE MECHANISM

(71) Applicant: Apex Brands, Inc., Apex, NC (US)

(72) Inventor: Kai Zhang, Charlotte, NC (US)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 18/272,393

(22) PCT Filed: Feb. 4, 2022

(86) PCT No.: PCT/US2022/015176
§ 371 (c)(1),
(2) Date: Jul. 14, 2023

(87) PCT Pub. No.: WO2022/170014
PCT Pub. Date: Aug. 11, 2022

(65) Prior Publication Data
US 2024/0035796 A1    Feb. 1, 2024

Related U.S. Application Data

(60) Provisional application No. 63/146,146, filed on Feb. 5, 2021.

(51) Int. Cl.
*G01B 3/1071*    (2020.01)

(52) U.S. Cl.
CPC .... *G01B 3/1071* (2013.01); *G01B 2003/1079* (2013.01)

(58) Field of Classification Search
CPC .................. G01B 3/1071; G01B 2003/1079
See application file for complete search history.

(56) References Cited

U.S. PATENT DOCUMENTS

| | | | | |
|---|---|---|---|---|
| 4,155,168 A | | 5/1979 | Dubois | |
| 4,651,429 A | * | 3/1987 | Ljungberg | G01B 3/1005 242/381.3 |
| 6,131,844 A | * | 10/2000 | Hsu | G01B 3/1005 242/380 |
| 6,367,161 B1 | * | 4/2002 | Murray | G01B 3/1003 33/771 |

(Continued)

FOREIGN PATENT DOCUMENTS

WO    2007104983 A1    9/2007

OTHER PUBLICATIONS

International Search Report and Written Opinion of International Application No. PCT/US2022/015176 dated May 13, 2022.

*Primary Examiner* — Yaritza Guadalupe-McCall
(74) *Attorney, Agent, or Firm* — Burr & Forman LLP

(57) ABSTRACT

A measuring tape device may include a housing having an aperture, a reel assembly enclosed within the housing, a blade formed from a metallic strip of material having a first end configured to extend from the housing through the aperture and a second end configured to be wound on the reel assembly, and an anti-rollover assembly disposed proximate to the aperture. The blade may be cupped to have a concave upper surface and a convex lower surface. The blade may have a first side and a second side that oppose each other relative to an apex of the concave upper surface and the convex lower surface. The anti-rollover assembly may be configured to enable an operator to selectively flatten the first side or the second side of the blade.

20 Claims, 9 Drawing Sheets

(56) References Cited

U.S. PATENT DOCUMENTS

| | | | |
|---|---|---|---|
| 6,442,863 B1 | 9/2002 | Poineau et al. | |
| 7,096,596 B2 * | 8/2006 | Hernandez, Jr. | G01B 3/1003 33/771 |
| 7,174,654 B2 * | 2/2007 | Hernandez, Jr. | G01B 3/1003 33/771 |
| 7,490,500 B2 * | 2/2009 | Hernandez, Jr. | G01B 3/1003 72/364 |
| 10,989,512 B2 * | 4/2021 | McKenzie | G01B 3/1056 |
| 11,480,418 B2 * | 10/2022 | McKenzie | G01B 3/1003 |
| 11,761,745 B2 * | 9/2023 | Higgins | G01B 3/1007 33/769 |
| 2006/0059703 A1 * | 3/2006 | Hernandez, Jr. | G01B 3/1003 33/757 |
| 2007/0240477 A1 * | 10/2007 | Hernandez, Jr. | G01B 3/1003 72/253.1 |
| 2023/0072940 A1 * | 3/2023 | Zhang | G01B 3/1071 |
| 2023/0213322 A1 * | 7/2023 | Higgins | G01B 3/1007 33/769 |

\* cited by examiner

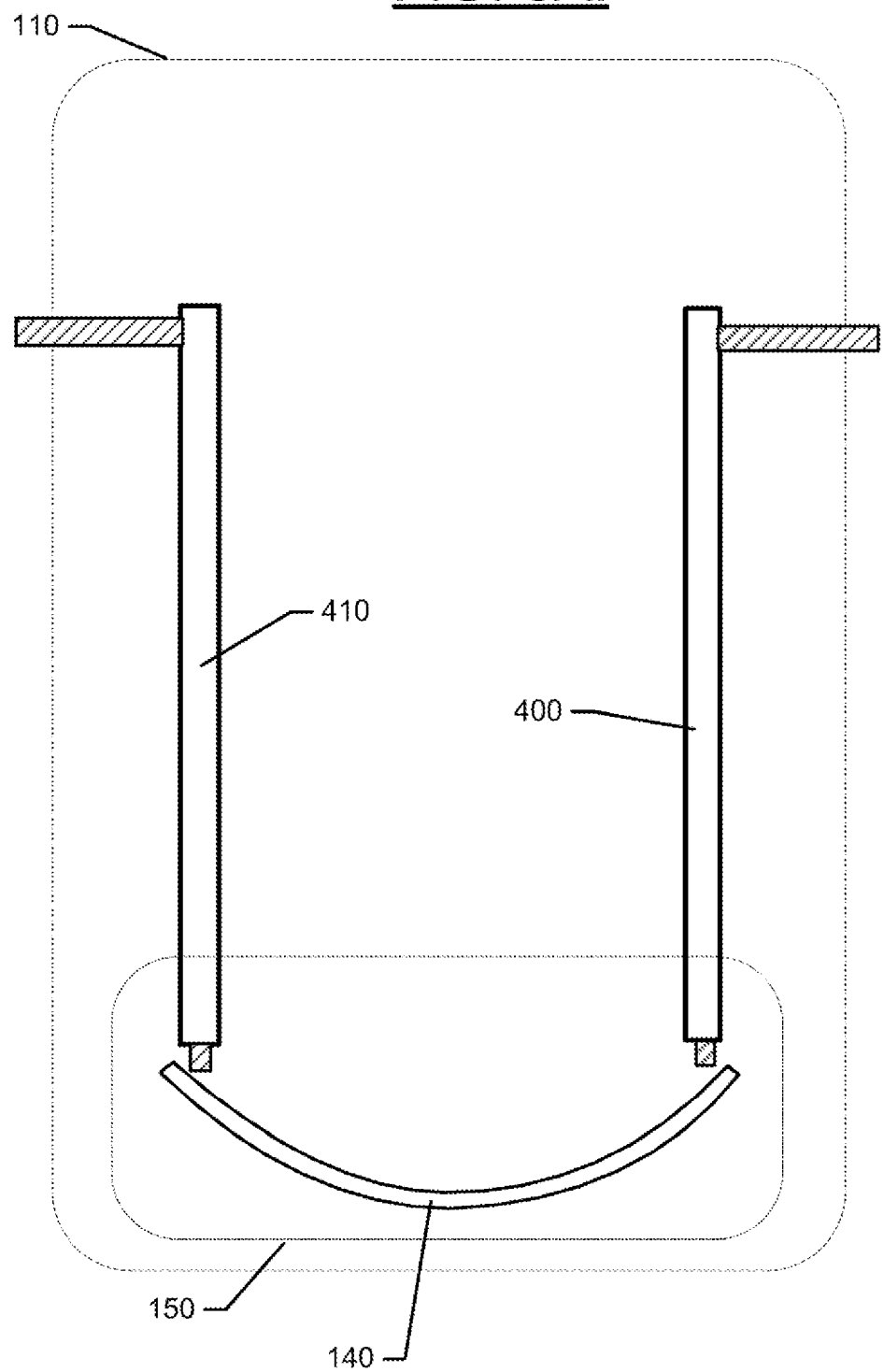

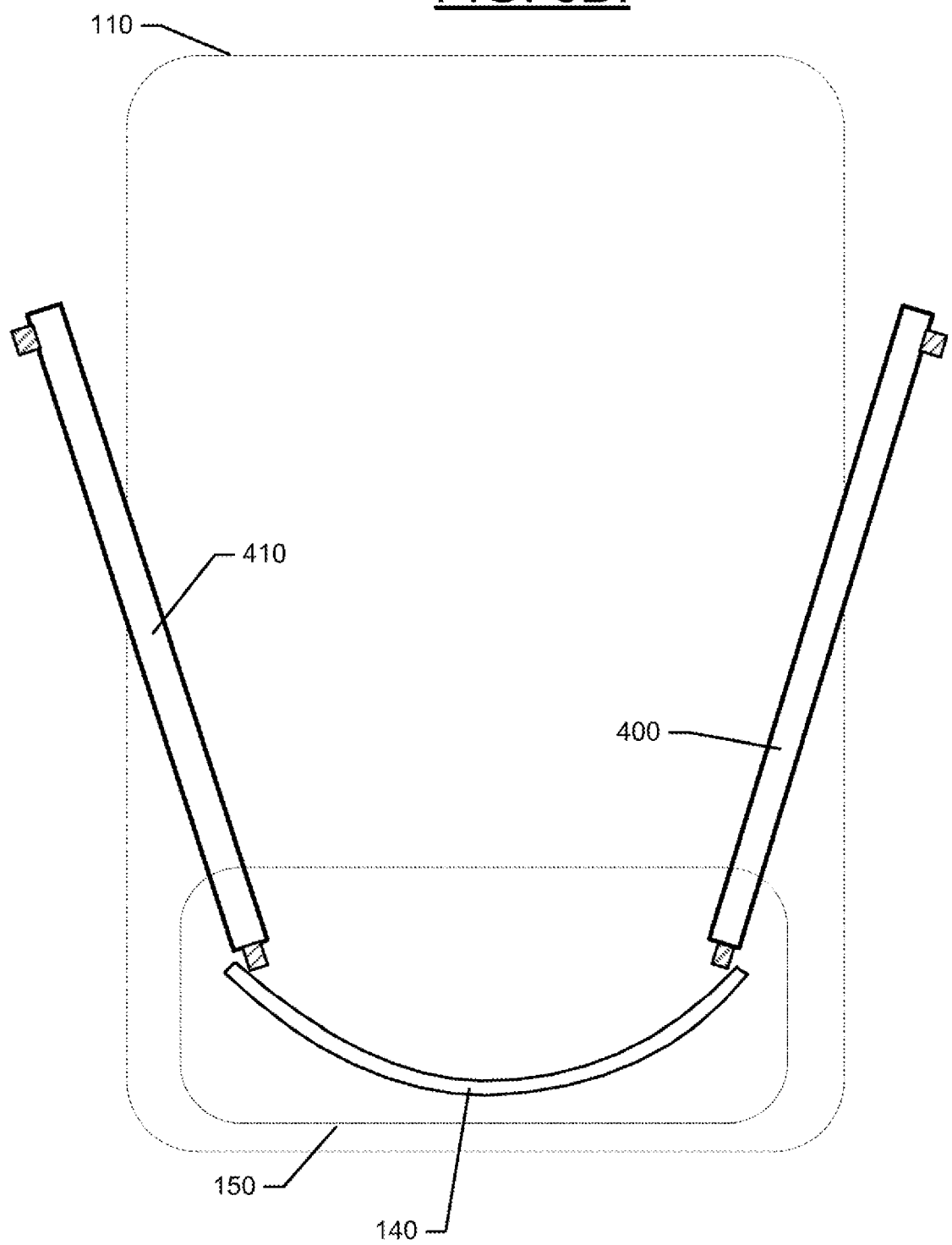

MEASURING TAPE WITH ROLLOVER RESISTANCE MECHANISM

TECHNICAL FIELD

Example embodiments generally relate to measuring tape devices, and particularly relate to a measuring tape that has a mechanism incorporated therein that is designed to reduce the incidence of rollover responsive to blade extension.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For measuring tapes having length in a range of about 12 ft to 50 ft, self-retracting mechanisms and using metallic tape ribbons for the tape (or blade) are very common.

For nearly a century, metallic tape ribbons with a curved (or cupped) and relatively stiff construction have been preferred for use in self-retracting measuring tapes. The metallic tape ribbon tends to be flexible enough to permit the metallic tape ribbon to be wound onto a spring loaded reel assembly, but stiff enough to have a relatively long standout. The cupping of the metallic tape ribbon further enhances the standout without negatively impacting the ability of the metallic tape ribbon to be wound onto the reel assembly. By employing the end hook at one end of the tape, the user may take advantage of the standout to pay out the measuring tape toward an anchor point on a medium that is to be measured and then conduct the measurement without having to physically move to the anchor point to affix the end hook and then move away to make the measurement. Given the time and energy that can be saved by this method of measurement, taking advantage of the standout characteristics of a self-retracting measuring tape is a very popular feature. So much so, in fact, that it is not uncommon to see a user make multiple attempts to utilize standout and catch a remote end of media being measured with the end hook, rather than simply moving to the remote end of the media to manually fix the end hook to the remote end. When the standout is poor, and the user has to use multiple attempts, or fails and must resort to moving to the remote end to affix the end hook, frustration may grow, and the user may seek out a measuring tape with better standout characteristics.

Invariably, each measuring tape will have a certain length that effectively defines the maximum standout that can be achieved before the tape bends and basically collapses. The measuring tape can no longer be extended reliably toward the anchor point once this collapse occurs. However, the collapse that occurs at maximum standout is not the only type of tape bending or collapse that can occur with metallic tape ribbons. In this regard, another collapse phenomena that can occur is called rollover. Rollover occurs when the blade is rotated about the longitudinal axis of the blade. The rotation of the blade about the longitudinal axis may be desirable when measuring vertical surfaces (e.g., walls, doors, windows, etc.).

For maximum standout, the blade is extended with the apex of the convex side of the cupped shape pointing straight toward the ground. As the blade is rotated about the longitudinal axis and extended, even typical blades that are designed for long standout will tend to collapse when the angle of rotation nears 90 degrees at a relatively small amount of extension. Meanwhile, standout characteristics of some blades may enable extension of greater than 10 feet or 12 feet. Thus, it may be desirable to improve anti-rollover characteristics to decrease the gap between the maximum standout and the length at which rollover occurs.

BRIEF SUMMARY OF SOME EXAMPLES

Some example embodiments may enable the provision of a measuring tape device that has a mechanism for providing improved anti-rollover characteristics.

In an example embodiment, a measuring tape device may be provided. The measuring tape device may include a housing having an aperture, a reel assembly enclosed within the housing, a blade formed from a metallic strip of material having a first end configured to extend from the housing through the aperture and a second end configured to be wound on the reel assembly, and an anti-rollover assembly disposed proximate to the aperture. The blade may be cupped to have a concave upper surface and a convex lower surface. The blade may have a first side and a second side that oppose each other relative to an apex of the concave upper surface and the convex lower surface. The anti-rollover assembly may be configured to enable an operator to selectively flatten the first side or the second side of the blade.

In another example embodiment, a measuring tape device may include a housing having an aperture, a reel assembly enclosed within the housing, a blade formed from a metallic strip of material having a first end configured to extend from the housing through the aperture and a second end configured to be wound on the reel assembly, and an anti-rollover assembly disposed proximate to the aperture. The anti-rollover assembly may be configured to inhibit rollover of the blade by selectively flattening a side of the blade that is opposite a direction of rotation of the blade.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 6A illustrates a schematic view of one structural arrangement for the anti-rollover assembly according to an example embodiment; and FIG. 6B illustrates a different structural arrangement for the anti-rollover assembly according to an example embodiment.

DETAILED DESCRIPTION

Figure 1:
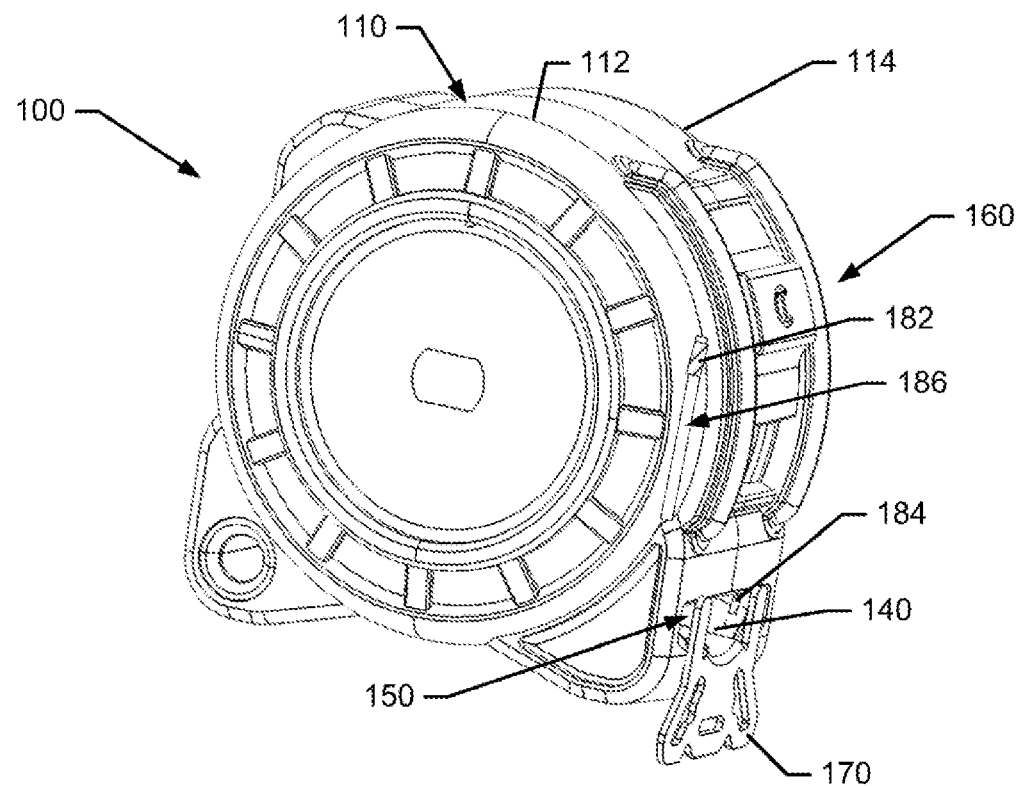
FIG. 1 illustrates a perspective view of a measuring tape device in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a measuring tape device that may have an improved capability for providing resistance to rollover. This may be accomplished by providing an anti-rollover mechanism integrated into the case or housing of the measuring tape device to the apex of the top and/or bottom of the blade extending away from the end hook, and over a limited length of the blade (e.g., 12 inches to 96 inches). FIG. 1 illustrates a perspective view of a measuring tape device, FIG. 2 illustrates a block diagram of such device, in accordance with an example embodiment, and FIG. 3 (which is defined by FIGS. 3A and 3B) illustrates a front view of the blade of the measuring tape device.

Figure 2:
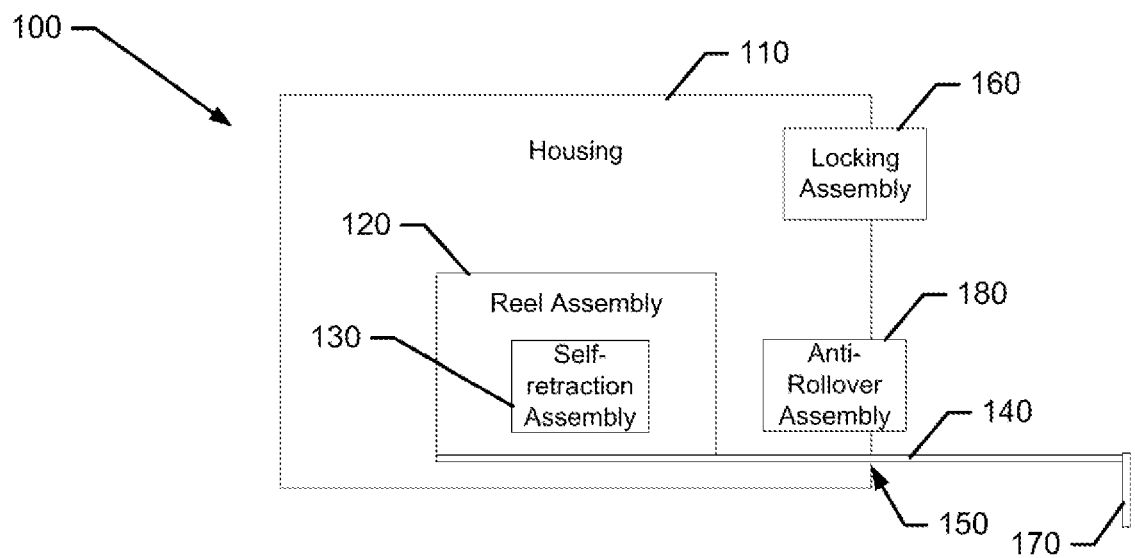
FIG. 2 illustrates a block diagram of the measuring tape device in accordance with an example embodiment.
Figure 3A:
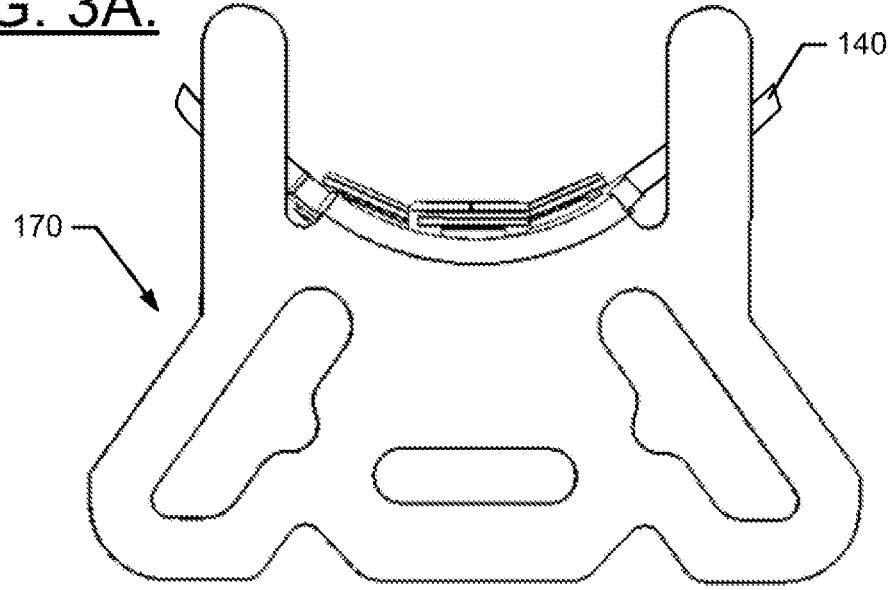
FIG. 3A illustrates a front view of the end hook and blade in a normal orientation in accordance with an example embodiment.

Referring now to FIGS. 1-3, a measuring tape device 100 of an example embodiment may include a housing 110 that, to simplify manufacture, may include a first case half 112 and a second case half 114. The first and second case halves 112 and 114 may house a reel assembly 120 and a self-retraction assembly 130 therein. A blade 140 (or tape) portion of the device 100 may be wound onto the reel assembly 120. The blade 140 may be paid out through an aperture 150 formed in the housing 110. A locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is affixed to the reel assembly 120 at the other end of the blade 140. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

As mentioned above, for a typical measuring tape, when the blade 140 is paid out through the aperture 150, the blade 140 will extend relatively straight out the aperture 150 (although some sagging or droop may be noticed due to the weight of the blade 140). The blade 140 can be extended in a guided fashion toward an intended target anchor point while the blade 140 continues to have sufficient rigidity to standout. The blade 140 will continue to extend and standout until the weight of the blade 140 extended past the aperture 150 is sufficient to cause the blade 140 to collapse and bend, thereby losing its rigidity and preventing any further guided extension. The loss of sufficient rigidity which causes collapse and bending of the blade 140 at a length of maximum standout generally occurs at a portion of the blade 140 that can be referred to as a "critical region" since it can occur at slightly different points (but generally in the same region) on different extension operations, and on different individual measuring tapes.

Figure 3B:
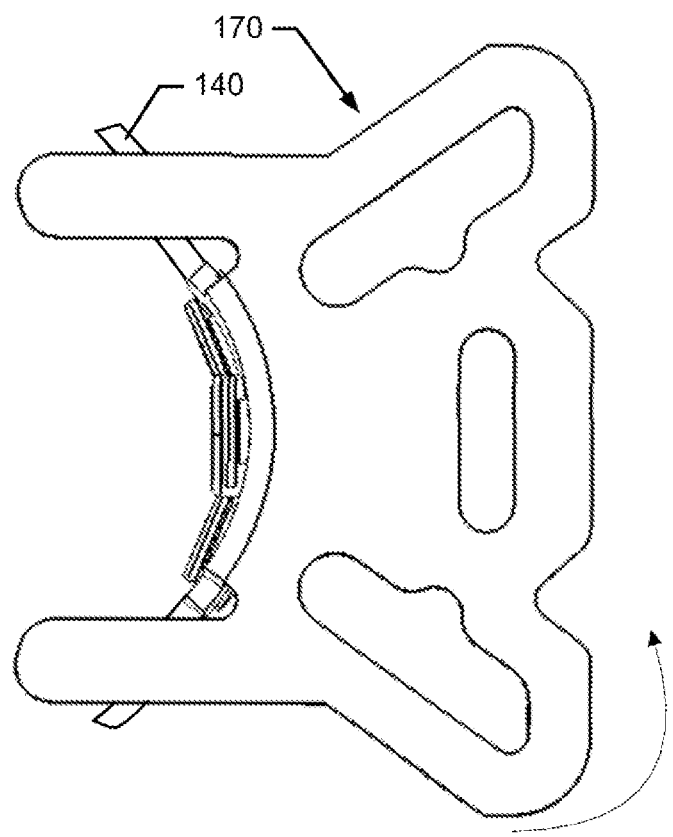
FIG. 3B illustrates the end hook and blade rotated about ninety degrees about a longitudinal axis of the blade in accordance with an example embodiment.

It may be possible to increase the standout capabilities of the blade 140 by changing certain characteristics of the blade 140. For example, the cupping of the blade 140 such that a convex curve having an apex that is generally faced toward the ground when the blade 140 is extended to achieve maximum standout is well known to improve standout of the blade 140. This is the orientation shown in FIG. 3A. However, the blade 140 is not always paid out (or held) in this orientation. To the contrary, in some cases, measurement of vertical surfaces or structures may call for paying the blade 140 out of the housing 110 at an angled orientation (e.g., rotated about the longitudinal axis of the blade 140 as much as by 90 degrees, and generally at greater than 60 degrees). FIG. 3B shows the blade 140 and end hook 170 rotated by 90 degrees so that the apex of the convex side of the cupped blade is now rotated 90 degrees and to the viewer's right. For a typical blade that is constructed to have improved standout, a collapse or bending phenomenon referred to as rollover (which is similar to that which occurs at maximum standout in terms of the collapse or bending of the blade 140 that occurs) can occur at a corresponding critical region for rollover. The critical region for rollover for many cupped blades often tends to occur at between two and three feet of extension out of the housing 110.

Figure 4:
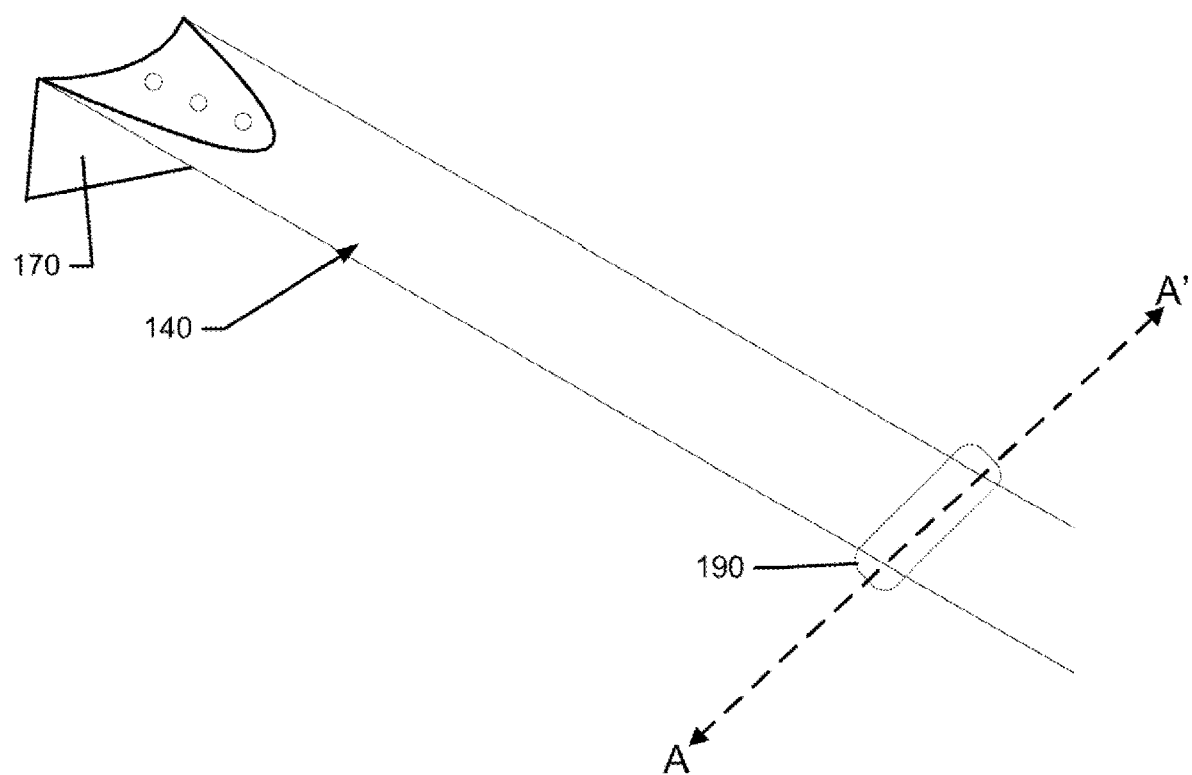
FIG. 4 illustrates perspective view of the blade of an example embodiment.

This critical region for rollover can, however, be extended by modifying the structure of the blade 140 (temporarily) using a mechanism provided at the housing 110. In this regard, by adding an anti-rollover mechanism (e.g., anti-rollover assembly 180) to a portion of the housing 110, the blade 140 may be deformed mechanically at a selected portion that is useful for preventing rollover. In this regard, by actuating the anti-rollover assembly 180, the blade 140 may be mechanically deformed in a strategic way that increases the amount of extension of the blade 140 that can be achieved before rollover occurs. FIG. 4 illustrates a perspective view of the blade 140 (in isolation) paid out of the aperture 150 of FIG. 1. Window 190 demonstrates an outline of the aperture 150 through which the blade 140 extends, and line A-A' illustrates a section cut that may be performed through the blade 140 to define a cross section view thereof at or otherwise proximate to the aperture 150.

FIG. 5, which is defined by FIGS. 5A, 5B, 5C, 5D, 5E and 5F, illustrates how the above-described improvement may be accomplished in accordance with an example embodiment. In this regard, the blade 140 of some embodiments may be made of metallic material (e.g., carbon steel) that may have a relatively high strength, but also have elastic properties when cut into a relatively thin sheet (as is the case for the blade 140). The blade 140 is typically cupped (i.e., bent to have a convex lower surface and concave upper surface) to improve standout. The cupping is maintained as the blade 140 is withdrawn from the housing 110 (when the housing 110 is oriented normally as shown in FIG. 1) and generally retains the cupped shape until maximum standout is reached, and the blade 140 collapses. Similarly, the cupped shape is retained when the housing 110 is rotated near or to 90 degrees about an axis of the extended blade 140 (as shown in FIG. 3B). However, when the blade 140 is extended to a certain point, rollover occurs and the blade 140 collapses.

When nearing the region at which rollover typically occurs (e.g., between about 2 ft to 4 ft of blade 140 extension from the housing 110), it may be possible to employ the anti-rollover assembly 180 to reinforce the blade 140 against the occurrence of rollover. In this regard, the anti-rollover assembly 180 may flatten a portion of the blade 140 (thereby mechanically deforming the blade 140 relative to the normal cupped configuration) proximate to the aperture 150. The flattening (which is shown in detail in FIG. 5) may add a force that tends to strengthen the blade 140 in resistance to rollover, and may allow the blade 140 to be extended significantly farther without rollover.

In an example embodiment, the anti-rollover assembly 180 may be disposed at a portion of the housing 110 that is proximate to the aperture 150. In some cases, the anti-rollover assembly 180 may be located within the housing 110 just inside and above the aperture 150. However, one or more portions thereof (e.g., an actuator or actuators) may extend outside the housing 110 in order to enable a user to manually operate the anti-rollover assembly 180. In this regard, for example, the anti-rollover assembly 180 may include an actuator 182 that may protrude from the housing 110 to enable the user to manually operate the actuator 182. The actuator 182 may be operably coupled to a blade bender 184 (or flattener), which may be a sliding plunger, a push rod, or other device that can move linearly, pivotally or otherwise exert a force on the blade 140 responsive to actuation of the actuator 182. In FIG. 1, a slide channel 186 is shown inside which the actuator 182 may slide when pushed downward by the user. The blade bender 184 may then exert a force on a top surface of one of the cupped sides of the blade 140 to bend the blade 140 (on that side), which may straighten (or bend flat) the corresponding side of the blade 140. The side of the blade 140 that is flattened may then be the top side of the blade 140 for extended rotation (without rollover). The blade bender 184 may be configured to exert a force in a range between about 0.1 lbs to about 100 lbs in order to flatten blades having different thicknesses and amounts of cupping. Extension without rollover can therefore routinely be achieved to distances as far as 5 feet or more.

Figure 5A:
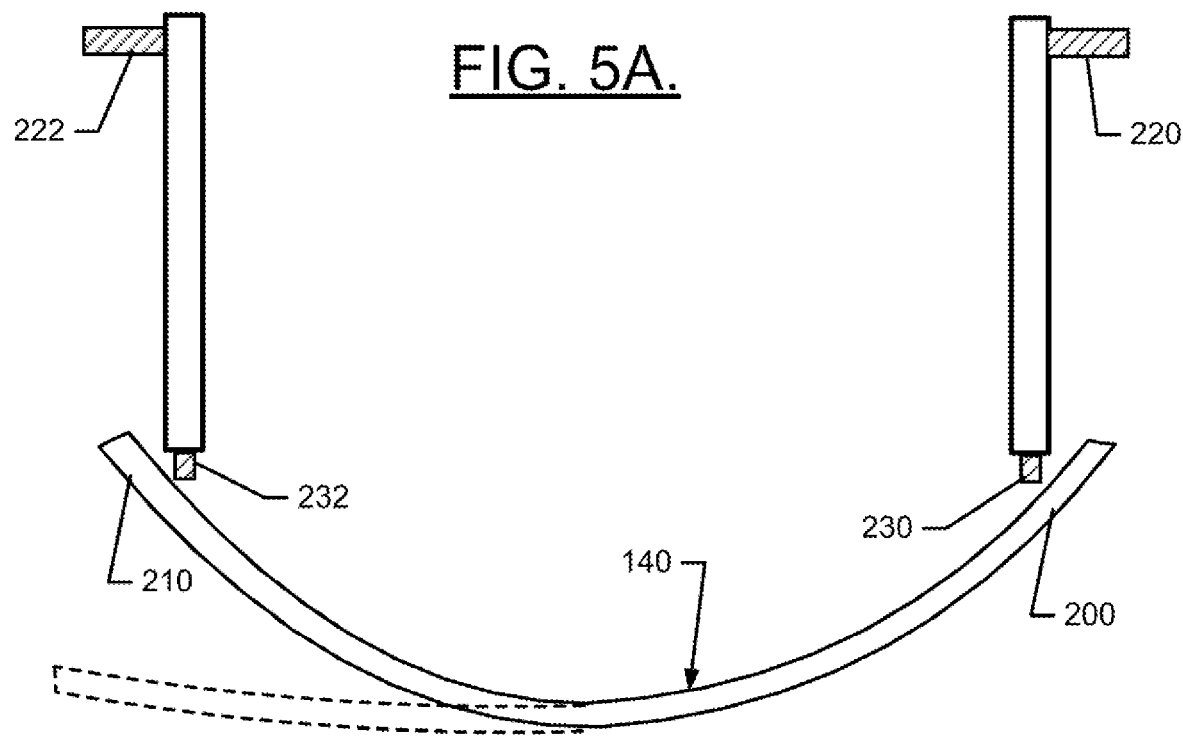
FIG. 5A illustrates a cross section view of the blade with components of the anti-rollover assembly poised to flatten a left side of the blade according to an example embodiment.

Referring to FIG. 5A. it may be assumed that the end hook 170 is at a portion of the blade 140 that extends into the page. Thus, the blade 140 may have a right side 200 and a left side 210. The anti-rollover assembly 180 may also include a right actuator 220 and a left actuator 222 on right and left sides of the housing 110, respectively (where the aperture 150 is considered the front of the housing 110). The right and left actuators 220 and 222 may each be an example of the actuator 182 of FIG. 1. The right and left actuators 220 and 222 may be operably coupled to a corresponding one of a right blade bender 230 and a left blade bender 232.

Figure 5B:
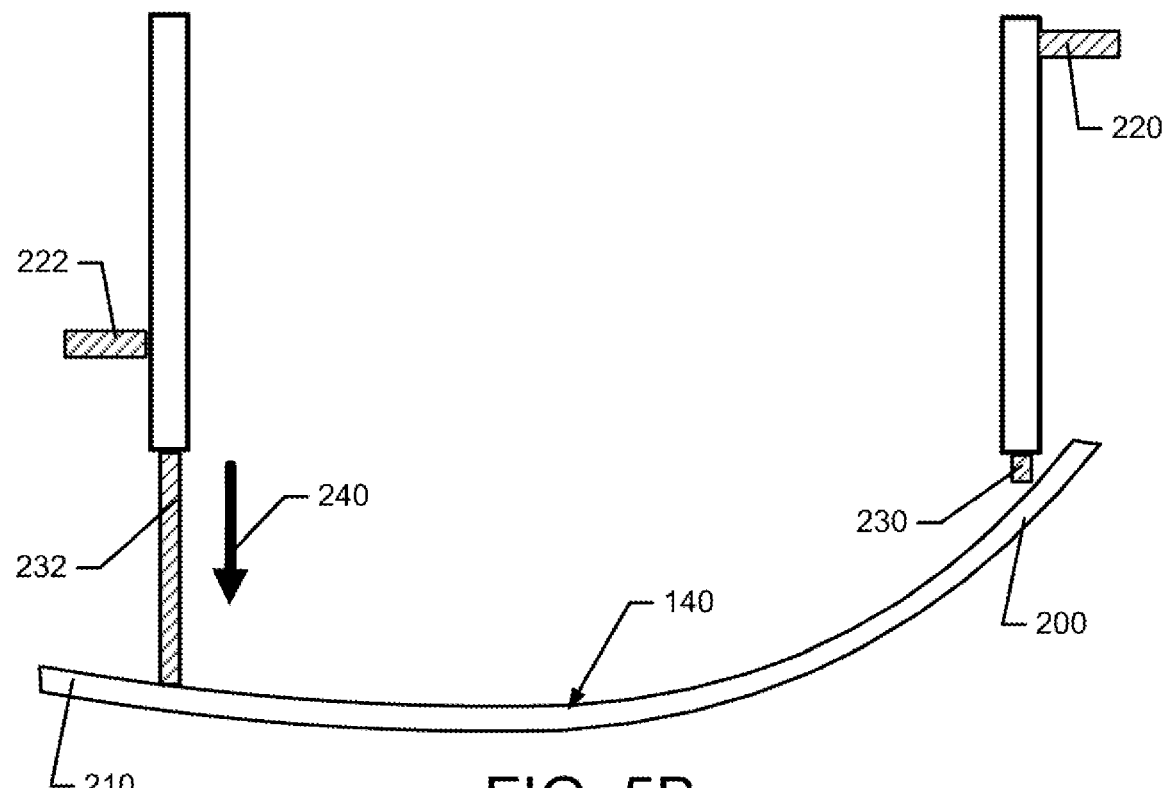
FIG. 5B illustrates the left side of the blade being flattened according to an example embodiment.
Figure 5C:
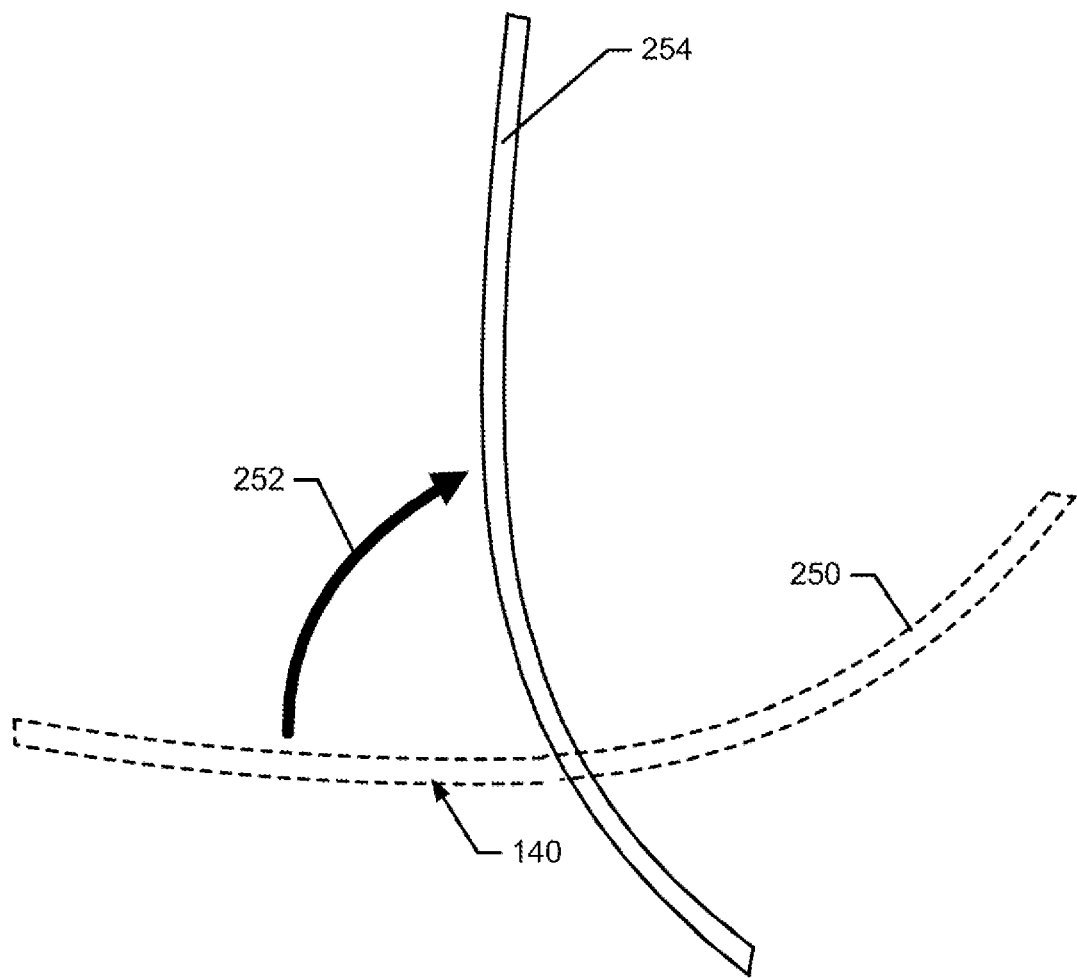
FIG. 5C illustrates the blade before and after rotation with anti-rollover mitigation applied in accordance with an example embodiment.
Figure 5D:
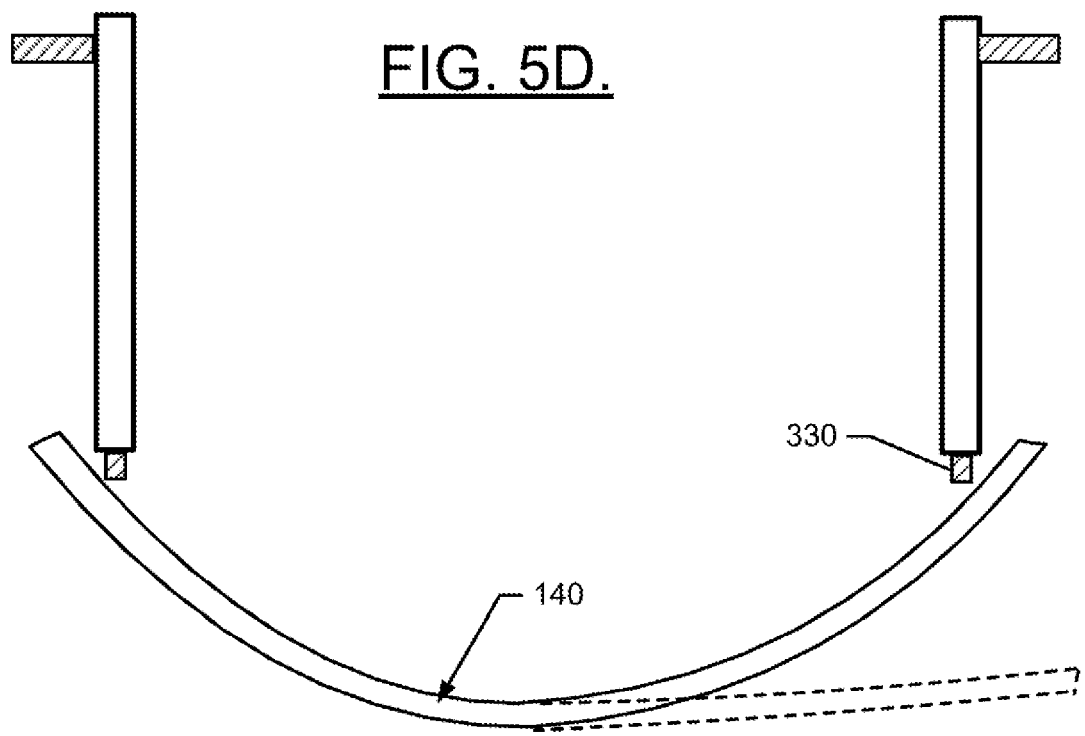
FIG. 5D illustrates a cross section view of the blade with components of the anti-rollover assembly poised to flatten a right side of the blade according to an example embodiment.

In order to support rotation of the blade 140 to the right, straightening or flattening of the left side 210 of the blade 140 (as shown by the dashed line position in FIG. 4A) may be desired. To flatten the left side 210 of the blade 140, the user may move the left actuator 222 downward in the direction of arrow 240. The left actuator 222 may then carry the left blade bender 232 downward and into contact with the left side 210 of the blade 140. Force may be exerted on the left side 210 in the direction of arrow 240, as shown in FIG. 5B to flatten the left side 210 of the blade 140 relative to the right side 200. Specifically, force may be exerted on the top surface of the left side 210 of the blade 140 to flatten the left side 210 of the blade 140. The blade 140 may then be rotated from the un-rotated position 250 of FIG. 5C by pivoting the housing 110 to the right in the direction of arrow 252. The blade 140 may, for example, be pivoted about 90 degrees to the rotated position 254 of FIG. 5C.

Figure 5E:
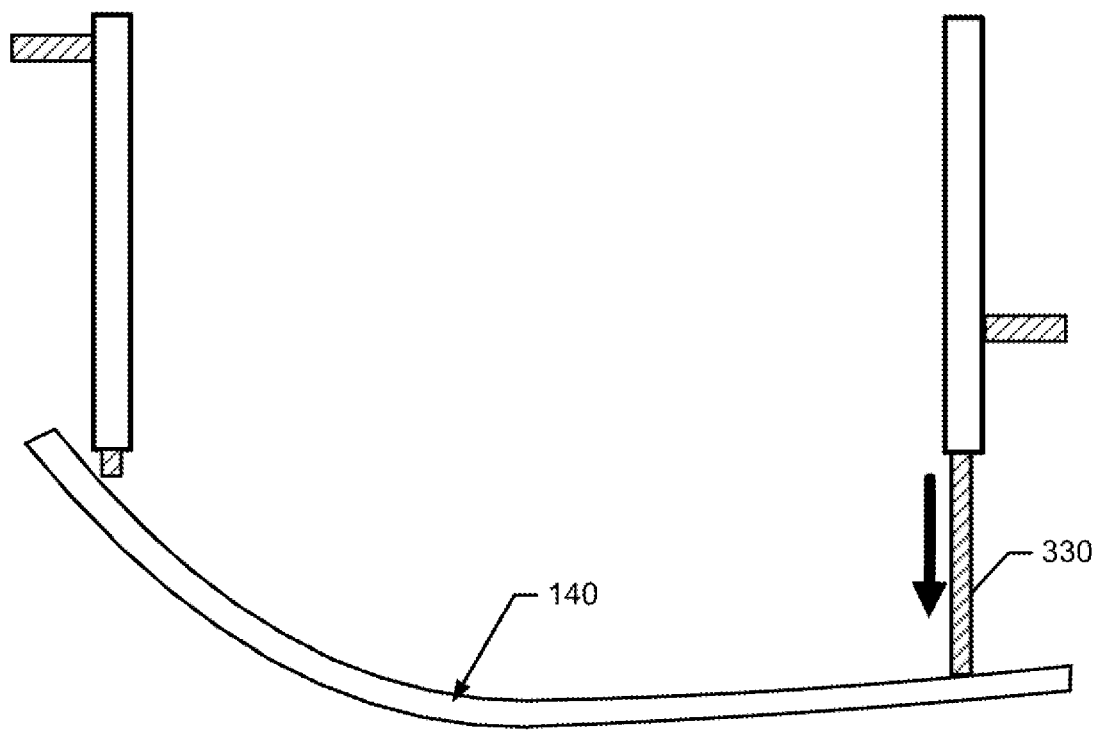
FIG. 5E illustrates the right side of the blade being flattened according to an example embodiment.
Figure 5F:
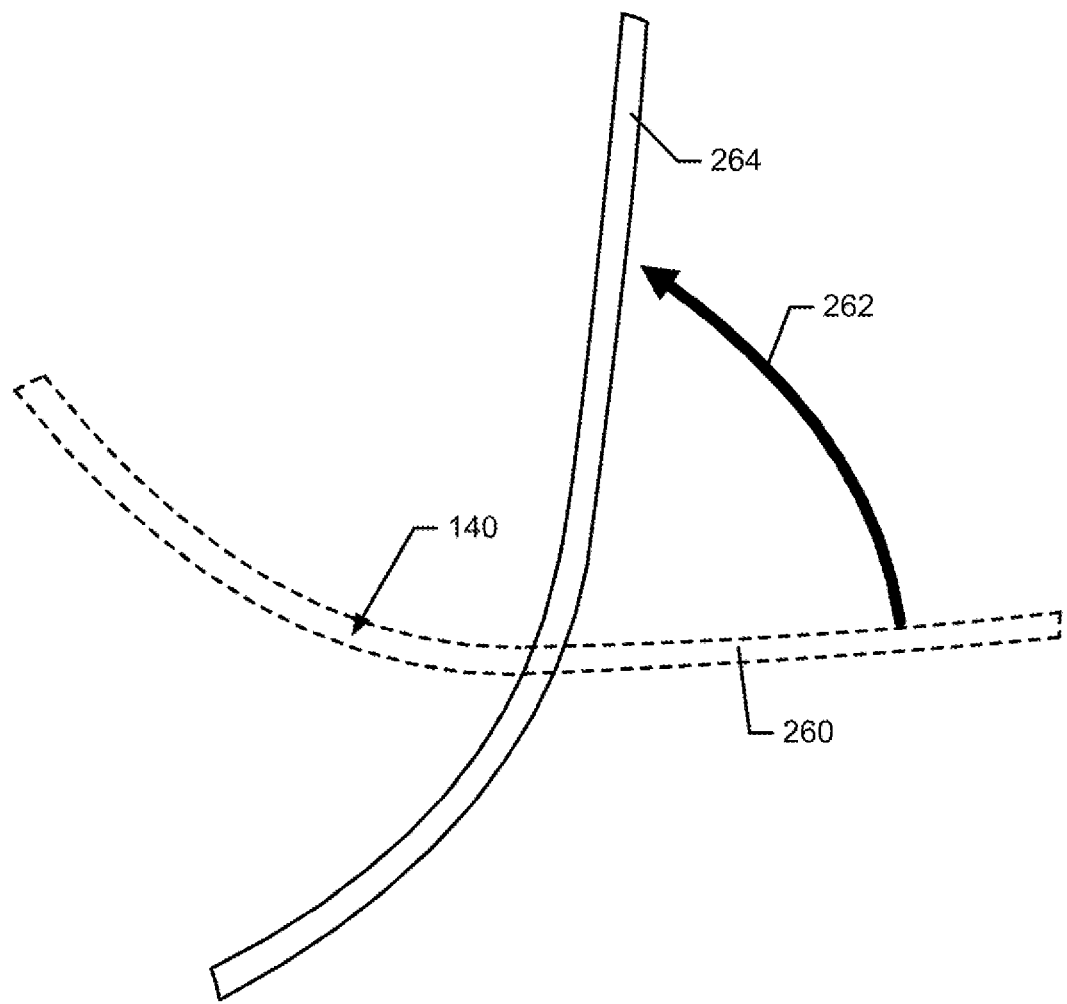
FIG. 5F illustrates the blade before and after rotation with anti-rollover mitigation applied in accordance with an example embodiment.

In order to support rotation of the blade 140 to the left, straightening or flattening of the right side 200 of the blade 140 (as shown by the dashed line position in FIG. 5D) may be desired. To flatten the right side 200 of the blade 140, the user may move the right actuator 220 downward in the direction of arrow 242. The right actuator 220 may then carry the right blade bender 230 downward and into contact with the right side 200 of the blade 140. Force may be exerted on the right side 200 in the direction of arrow 242, as shown in FIG. 5E to flatten the right side 200 of the blade 140 relative to the left side 210. Specifically, force may be exerted on the top surface of the right side 200 of the blade 140 to flatten the right side 200 of the blade 140 (while the left side 210 remains cupped or curved). The blade 140 may then be rotated from the un-rotated position 260 of FIG. 5F by pivoting the housing 110 to the left in the direction of arrow 262. The blade 140 may, for example, be pivoted about 90 degrees to the rotated position 264 of FIG. 5F.

In other words, the side of the blade 140 that is opposite the direction of rotation that is desired may be flattened mechanically by the anti-rollover assembly 180. The "high" side (after rotation) of the blade 140 is therefore always desired to be the flattened side of the blade 140. Moreover, it should be appreciated that the flattening of the blade 140 is a local phenomenon at the aperture 150. Other portions of the blade 140 (e.g., about one inch away or more on either side of the aperture 150) will not tend to show any (or much)

evidence of the bending that is occurring at the high side of the blade 140 just inside (or otherwise near) the aperture 150). In some cases, the apex of the blade 140 may abut the aperture 150 (or another part of the housing 110 proximate thereto) to provide a fulcrum about which to exert the bending force on the corresponding side of the blade 140 that is to be flattened. Thus, for example, after the right side 200 of the blade 140 is "flattened," the right blade bender 230 may pinch the right side 200 of the blade 140 against a portion of the aperture 150 (or housing 110 near the aperture 150). Alternatively, after the left side 210 of the blade 140 is "flattened," the left blade bender 232 may pinch the left side 210 of the blade 140 against a portion of the aperture 150 (or housing 110 near the aperture 150). However, such pinching is not required, and contact could be limited to only the top surface of the blade 140 in some cases.

In some cases, the distal end of the right and left blade benders 230 and 232 may be rounded, and/or may be formed of a material that does not scratch or mar the top surface of the blade 140. Thus, in some cases, the blade 140 may continue to be extracted or withdrawn from the housing 110 through the aperture 150 even while one of the right or left blade benders 230 or 232 is actively bending or flattening the blade 140.

FIG. 6, which is defined by FIGS. 6A and 6B, illustrates schematic views of some structural arrangements that may be employed to instantiate the anti-rollover assembly 180 of some embodiments. In this regard, FIG. 6A illustrates an example in which right blade bender 400 and left blade bender 410 are each located entirely within the housing 110. Moreover, in this example, the right blade bender 400 and the left blade bender 410 move linearly up and down inside the housing 110 to engage the blade 140 (i.e., on right and left sides of the blade 140, respectively). As such, the right blade bender 400 and the left blade bender 410 move substantially parallel to the sides of the housing 110. However, alternate structures are also possible.

In this regard, for example, FIG. 6B shows the right and left blade benders 400 and 410, respectively, extending partially outside the housing 110. Accordingly, in the example of FIG. 6B, the right and left blade benders 400 and 410 do not move parallel to the sides of the housing 110. Instead, the right and left blade benders 400 and 410 are each angled (e.g., to form an acute angle) relative to the sides of the housing 110 and penetrate through a portion of the housing 110 (instead of only an actuator portion thereof extending out of the housing 110, as was the case for the example of FIG. 6A).

In an example embodiment, a measuring tape device may be provided. The measuring tape device may include a housing having an aperture, a reel assembly enclosed within the housing, a blade formed from a metallic strip of material having a first end configured to extend from the housing through the aperture and a second end configured to be wound on the reel assembly, and an anti-rollover assembly disposed proximate to the aperture. The blade may be cupped to have a concave upper surface and a convex lower surface. The blade may have a first side and a second side that oppose each other relative to an apex of the concave upper surface and the convex lower surface. The anti-rollover assembly may be configured to enable an operator to selectively flatten the first side or the second side of the blade.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, in some cases the anti-rollover assembly may include a first actuator disposed on a first side of the housing, and a second actuator disposed on a second side of the housing. In an example embodiment, the first actuator may be operably coupled to a first blade bender configured to flatten the first side of the blade responsive to the operator actuating the first actuator, and the second actuator may be operably coupled to a second blade bender configured to flatten the second side of the blade responsive to the operator actuating the second actuator. In some cases, the first and second blade benders may each include a sliding rod configured to move linearly within the housing to engage the concave upper surface of the blade. In an example embodiment, the sliding rod may be disposed in the housing to move substantially parallel to sidewalls of the housing. In some cases, the sliding rod may be disposed in the housing to move at an acute angle relative to sidewalls of the housing. In an example embodiment, the sliding rod may penetrate through sidewalls of the housing. In some cases, the first and second blade benders may pinch a respective one of the first and second sides of the blade against a portion of the housing or the aperture to flatten the respective one of the first and second sides of the blade. In an example embodiment, the first and second blade benders may each be configured to slidingly engage the concave upper surface of the blade such that the blade is extendable from the housing when the first or second blade bender is actuated. In some cases, the anti-rollover assembly may be configured to flatten the first side or the second side based on which of the first side or the second side is opposite a direction or rotation of the housing.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A measuring tape device comprising:
   a housing having an aperture;
   a reel assembly enclosed within the housing;
   a blade formed from a metallic strip of material having a first end configured to extend from the housing through the aperture and a second end configured to be wound on the reel assembly; and
   an anti-rollover assembly disposed proximate to the aperture,
   wherein the blade is cupped to have a concave upper surface and a convex lower surface,
   wherein the blade has a first side and a second side that oppose each other relative to an apex of the concave upper surface and the convex lower surface, and
   wherein the anti-rollover assembly is configured to enable an operator to selectively flatten the first side or the second side of the blade.

2. The measuring tape device of claim 1, wherein the anti-rollover assembly comprises a first actuator disposed on a first side of the housing, and a second actuator disposed on a second side of the housing.

3. The measuring tape device of claim 2, wherein the first actuator is operably coupled to a first blade bender configured to flatten the first side of the blade responsive to the operator actuating the first actuator, and
   wherein the second actuator is operably coupled to a second blade bender configured to flatten the second side of the blade responsive to the operator actuating the second actuator.

4. The measuring tape device of claim 3, wherein the first and second blade benders each comprises a sliding rod configured to move linearly within the housing to engage the concave upper surface of the blade.

5. The measuring tape device of claim 4, wherein the sliding rod is disposed in the housing to move substantially parallel to sidewalls of the housing.

6. The measuring tape device of claim 4, wherein the sliding rod is disposed in the housing to move at an acute angle relative to sidewalls of the housing.

7. The measuring tape device of claim 4, wherein the sliding rod penetrates through sidewalls of the housing.

8. The measuring tape device of claim 3, wherein the first and second blade benders pinch a respective one of the first and second sides of the blade against a portion of the housing or the aperture to flatten the respective one of the first and second sides of the blade.

9. The measuring tape device of claim 3, wherein the first and second blade benders are each configured to slidingly engage the concave upper surface of the blade such that the blade is extendable from the housing when the first or second blade bender is actuated.

10. The measuring tape device of claim 1, wherein the anti-rollover assembly is configured to flatten the first side or the second side based on which of the first side or the second side is opposite a direction or rotation of the housing.

11. A measuring tape device comprising:
    a housing having an aperture;
    a reel assembly enclosed within the housing;
    a blade formed from a metallic strip of material having a first end configured to extend from the housing through the aperture and a second end configured to be wound on the reel assembly; and
    an anti-rollover assembly disposed proximate to the aperture,
    wherein the anti-rollover assembly is configured to inhibit rollover of the blade by selectively flattening a side of the blade that is opposite a direction of rotation of the blade.

12. The measuring tape device of claim 11, wherein the anti-rollover assembly comprises a first actuator disposed on a first side of the housing, and a second actuator disposed on a second side of the housing.

13. The measuring tape device of claim 12, wherein the first actuator is operably coupled to a first blade bender configured to flatten a first portion of the blade that is proximate the first side of the housing responsive to the operator actuating the first actuator, and
    wherein the second actuator is operably coupled to a second blade bender configured to flatten a second portion of the blade that is proximate the second side of the housing responsive to the operator actuating the second actuator.

14. The measuring tape device of claim 13, wherein the first and second blade benders each comprises a sliding rod configured to move linearly within the housing to engage an upper surface of the blade.

15. The measuring tape device of claim 14, wherein the sliding rod is disposed in the housing to move substantially parallel to sidewalls of the housing.

16. The measuring tape device of claim 14, wherein the sliding rod is disposed in the housing to move at an acute angle relative to sidewalls of the housing.

17. The measuring tape device of claim 14, wherein the sliding rod penetrates through sidewalls of the housing.

18. The measuring tape device of claim 13, wherein the first and second blade benders pinch a respective one of opposite sides of the blade against a portion of the housing or the aperture to flatten the respective one of the opposite sides of the blade.

19. The measuring tape device of claim 13, wherein the first and second blade benders are each configured to slidingly engage an upper surface of the blade such that the blade is extendable from the housing when the first or second blade bender is actuated.

20. The measuring tape device of claim 11, wherein the blade is cupped to have a concave upper surface and a convex lower surface, and
    wherein the anti-rollover assembly engages the concave upper surface on one side of an apex of the concave upper surface to selectively flatten the side of the blade that is opposite a direction of rotation of the blade.

\* \* \* \* \*